(12) United States Patent
Huang et al.

(10) Patent No.: US 9,135,208 B1
(45) Date of Patent: Sep. 15, 2015

(54) METHOD AND SYSTEM FOR GROUP MANAGEMENT

(75) Inventors: Rongsheng Huang, Poway, CA (US); Dumitru Mihai Ionescu, San Diego, CA (US); Abu Amanullah, San Diego, CA (US); Lichung Chu, San Diego, CA (US)

(73) Assignee: Olympus Corporation, Tokyo (JP)

( * ) Notice: Subject to any disclaimer, the term of this patent is extended or adjusted under 35 U.S.C. 154(b) by 499 days.

(21) Appl. No.: 13/446,586

(22) Filed: Apr. 13, 2012

(51) Int. Cl.
*G06F 15/16* (2006.01)

(52) U.S. Cl.
CPC ..................................... *G06F 15/16* (2013.01)

(58) Field of Classification Search
CPC ....................... H04L 41/0213; H04L 29/08072
USPC ........................................................... 709/223
See application file for complete search history.

(56) References Cited

U.S. PATENT DOCUMENTS

| | | | |
|---|---|---|---|
| 2002/0114286 A1* | 8/2002 | Iwamura et al. | 370/252 |
| 2012/0151205 A1* | 6/2012 | Raykova et al. | 713/150 |
| 2012/0155441 A1* | 6/2012 | Rousseau et al. | 370/337 |
| 2013/0121335 A1* | 5/2013 | Hui et al. | 370/390 |

* cited by examiner

*Primary Examiner* — Shripal Khajuria
(74) *Attorney, Agent, or Firm* — Sheppard Mullin Richter & Hampton LLP

(57) ABSTRACT

Systems and methods for group management in machine-to-machine networks are provided. Network nodes in a network group are divided into sub-groups and a group information register, which includes a listing of the nodes in the group, is divided into an equal number of partitions. The partitions are distributed to the sub-groups such that each node in a given sub-group receives the same partition. The partitions are accompanied by references to network nodes of other sub-groups (termed "anchor nodes") that have a copy of another partition of the group information register. When a new network head takes over the network group, it is able to use the available partitions to determine which partitions are missing and which nodes hold copies of the missing partitions. The group head can wake up the missing nodes and obtain the missing partition copies, thereby generating a complete copy of the group information register.

17 Claims, 11 Drawing Sheets

| Group-Related Info 550 | | | |
|---|---|---|---|
| Group ID 551 | Latest Version No. 552 | Latest Sub-version No. (Time Stamp) 553 | Max GISP Index (M) 554 |
| Node Info (List) 555 | | | |
| Node ID (and Temp ID) 556 | Session Key 557 | Last time of appearance 558 | Node Status 559 | GISP Index 560 | GISP 561 Status (Changed/not) |
| Dissemination GISP Index 562 | Last disseminated version No. (incl. sub-version No.) 563 | Anchor Node Flag 564 | |

Fig. 5B

| Version Record (List) 570 | | | | |
|---|---|---|---|---|
| GISP Index 571 | Latest affected sub-version No. 574 | Dissemination Status(Yes/No) 572 | Anchor Node ID 575 | Priority (weight) 573 |

Fig. 5C

METHOD AND SYSTEM FOR GROUP MANAGEMENT

TECHNICAL FIELD

The present invention relates generally to communication networks, and more particularly, some embodiments relate to group management of network devices for efficient group leader handover.

DESCRIPTION OF THE RELATED ART

The Internet of Things (IoT) concept and Machine-to-Machine (M2M) technologies have stimulated the development of putting devices, such as sensors, meters, appliances, and other machines on the Internet. Our current Internet is an internet of computers, including laptops, tablets, smart phones, media players and TVs. The Internet is witnessing the expansion of the Internet from pure computers to all kinds of smart machines. For example, the CERP (Cluster of European Research Projects) has made a list of the potential applications of IoT, which covers almost every aspect of society. Internet connected or online capable machines may soon pervade our office buildings, streets, vehicles, hospitals, recreational places, stores, factories, warehouses, forests, oceans, and so on. The online presence of these machines can create an omni-awareness of nearly every aspect of life through a connected PC. Additionally, we can be capable of accessing and control these machines. With the IoT, the geographical obstacles which have been imposing inconvenience for thousands of years can be easily overcome.

Currently the most popular application of IoT/M2M is RFID networks, which have already been used in supply chain management industry. Medical body sensors/actuators may soon be widely distributed, which will potentially form another type of IoT. Another popular application is the smart meters in current smart grid industry, which automatically report utility measurements to utility companies.

An appeal of the IoT is that many machines can form a huge resource pool and can be operated remotely. In some places, collecting data and making actuations are not suitable tasks for humans. Assigning dedicated human resource for these tasks might be costly or risky. Placing remotely operated sensors and actuators to fulfill these tasks saves time and provides safety. With the IoT in place, people can access and control these cyber-visible machines singly, in batch, or filtered with certain rules. We can expect a "cloud" of these machines in the near future.

Specifically, body area networks (BANs) may form an IoT. In a BAN, body sensors/actuators collect information and send the information to a processing center—for example, in a hospital—and carry out commands issued from the center remotely. Doctors and patients can access the body data online and some of the treatments can also be carried out online. With the use of medical IoT, the patients can be taken care of anywhere, greatly reducing hospitalization costs. Furthermore, the patient can gain more knowledge about their health, and thereby take more control of their health care. For example, the patient can adjust their clinic visitations according to their real-time health conditions.

In order to achieve the promises of the IoT, significant progress must still be made. IoT has some huge challenges which cannot be solved only by technical solutions; standardization and administration issues are also in the forefront. However, these challenges are expected given the course the current Internet experienced during its development. In addition to these standard challenges, a new technical challenge—termed group management—exists in the implementation of IoT.

Online machines are usually divided into groups according to different criteria. The machines having the same functions or objectives can be grouped together. For example, machines locating closely can be grouped together, machines from the same vendors can be grouped together, or machines having no correlation at all but being used by the same party can also be grouped together. In real scenarios, for example, RFID tags within the same shipment can be identified as in the same group. The appliances in the same smart home are in the same group. The surveillance devices in one building are in the same group. The body sensors/actuators in the same human body are in the same group. The creation of groups helps to manage the machines. Some of the groups are formed spontaneously, such as the RFID in one batch or the body sensors in one human body. Some of the groups are formed with a designated rule, such as the sensors in the vehicles from the same vendors or the same party. How to manage the groups in IoT is one of the design challenges that must be overcome.

In the networks for communication purpose (ADSL, cellular networks, wireless mesh networks or WLAN), nodes are grouped together to multiplex the network resource. In IoT, nodes are grouped together as a resource pool, which can be used by other machines or Internet users. Wireless sensor networks (WSNs), or Wireless Sensor/Actuator Networks (WSANs), have similar meanings in terms of groups as IoT since their nodes are both taken as a collective resource. However, the groups in WSANs and MANETs (mobile ad hoc networks) refer to divided sub-networks wherein and the group management is dealing with the internal issues inside the WSANs and MANETs, such as mobility management and secret key distribution. In contrast, many types of IoTs only have one-hop communication in star topologies where "sub-group management" does not apply. Moreover, in IoT, groups can have more diverse compositions than in WSANs and MANETs. A group can consist of one wireless hop neighboring nodes, multi-hop wireless nodes, or even wired nodes. The group head can be one hop away, two hops away, or in a combination of wired/wireless hops away.

Group management of machine to machine networks often have specific commonalities which must be taken into account during IoT system design. Such commonalities include:

1) Discontinuous Online Presence
   These cyber-visible machines are not required to be online all the time, which is usually due to power saving requirements and discontinuous traffic demand. For example, RFID tags may be required to be read only at certain check points by tag readers. Body sensors may send the data to the hospital processing centers only in certain time windows. Home appliances may not have much data to transmit and may not need to be online constantly.
2) On-demand group heads
   Since the nodes in IoT can be seen as collective resource pools (sensors, actuators, or RFID tags), different users can use them during different periods. Therefore, different group heads might take charge of the same group in different times. From the node's point of view, a new designated group head can take over the group at any time, under certain security regulations.
3) Lack of group information registers
   IoT systems have not been well developed. Most likely, the IoT will develop with the support of the current Internet by adding certain protocols. Therefore, it will be difficult to add new entities such as group information registers for IoT to support the group management. IP multicast techniques might be applied to achieve certain functionalities of group management. However, it is undesired to let routers to hold group information registers since group heads in IoT are usually portable devices and can be replaced from time to time.

4) Heterogeneous constitution

A group in IoT usually contains a set of smart machines, such as sensors and actuators. These machines might not have the same functionalities, making the group heterogeneous. This heterogeneity can bring challenges to group management scheme design.

Without group management, nodes can still connect to the head and have packets exchanged. However, if there is no group information maintenance in IoT, group heads can lose track of its group members due to sleeping, poor channel condition, multi-channel operating, or signaling failure (due to long delay, congestion, or unmatched keys), especially when a new head takes place of an old one.

For example, when RFID is used in product tracking, tag readers are spread in different places and the products move from one place to another. The tag readers update the nodes' information after they communicate with the nodes via RFID technology. In some cases, some nodes might not be able to update their information with one single attempt due to complicated wireless conditions. When these failures happen, product tracking will be less accurate.

In the BAN type of IoT, some nodes can also fail on their updates to the corresponding group heads. Although body sensors/actuators report to the same group heads (hubs) most of the time, there still are requirements for the group head changing in different scenarios. A first scenario is in the hospitalization period. When a patient is hospitalized or in a routine clinic visit, the hospital might provide a more powerful device to collect the patient's body data, which can potentially bypass the Internet and be capable of direct display and actuation. No matter whether the daily hub is powered off or not, the group of body sensors/actuators is required to change the association to the hospital-provided device. A second scenario is in the emergency case. When an emergency happens, the emergency personnel might need to watch the body data directly, which necessitates the body sensors/actuators' take-over by the emergency handheld devices. The last example of the group head changing can be seen during the maintenance operations, such as device replacement, etc. In any case of the above, if some node fails to associate with the new group head, accompanied risks will follow.

In the home appliance type of IoT, the head can also be changed from one router (or PC) to another. If some appliances change its association to the new head and some do not after a long time, malfunctioning of the coordination among appliances may occur. For example, the TV stays on despite an instruction that it should be turned off.

Besides keeping track of group members' information, the second potential benefit of a good group management scheme is to reduce signaling costs. With the transferred group information, the security association process can be skipped if the transferring is secure enough. Additionally, when the group handover proceeds smoothly, the nodes can save substantial amount of energy by not searching for the group head. Finally, an IoT with good group handover capability can have more flexibility, such as facilitated maintenance, ease in adding applications, and ease in administration.

Making nodes into groups is an intuitive way to manage a network of machines. However, the solution of group management does not come out spontaneously. In other types of networks, group heads usually have fixed coverage and connectivity, such as the base stations (BSs) in cellular systems, or the access points (APs) in WLAN, and have the support from an infrastructure, such as HLR/VLR system in cellular systems. However, the group heads in IoT and their relationship with online machines differ from these cases, making solutions for these cases inapplicable to an IoT of such nodes.

Group creation in IoT usually refers to the group ID allocation and group member addressing. The addressing task can be fulfilled by DHCP, IPV6 technique, or IGMP (Internet Group Management Protocol), or other techniques. However, due to the variety ways of the groups' constitution, extra signaling might be needed to create a group. Similarly, since some nodes might reside in different areas physically, extra signaling is needed to let a node join the group. Additionally, sometimes due to the large number of the group members or other specific reasons, having the group information in hand upon creating a group is not guaranteed. For example, an RFID tag reader does not know all the RFID tags in advance because the RFID tags may be dispersed throughout a large physical range. Due to privacy protection, a BAN's hub does not always know all the body sensors' information until the nodes connect to it. Additionally, as described above, a significant challenge for group management occurs during group handover.

If there is an infrastructure providing the latest group information, which requires each group member to update its information frequently, group handover can have lower probability of failure. Here, failure of group handover refers to one or more of the group members being unable to build an association with the new head. However, building an infrastructure for group management is not realistic in IoT.

Grouping idea is known in networking literature. Internet, cellular systems, mobile ad hoc networks (MANETs), and wireless sensor networks (WSNs) all have grouping ideas inside. However, these networks do not face the same problem set as group management in IoT.

Group management can frequently be found in the multicasting area related to Internet Protocol (IP). IGMP (Internet Group Management Protocol) is the most commonly used group management protocol. It gives a solution to multicasting in IP networks. Although IGMP can be applied to IoT, the group management of IGMP does not refer to the management of machine node groups and does not address the group handover problem in IoT. IPv6 has the same objective as IGMP, which is to find multiple IP addresses in one multicast. To achieve this goal, IGMP uses an auxiliary protocol other than IPv4 while IPv6 directly use an advanced addressing technique. The group management in IoT instead deals with the case of when the gateway of the nodes to the Internet is about to change. In addition, as described above, the nodes in IoT are not always online.

Usually the visiting location registers (VLRs) collocate with the BSs in cellular systems. When one node changes its head (serving BS), the new head can ask the old head for a copy of subscriber information because there is always a connection between the old head and the new one. If a group of nodes change their head in cellular systems, although new head is able to have the group information from the old one, simultaneous updates can cause the wireless signaling congestion.

Group management has also been frequently mentioned in MANETs, WSNs, whose focuses are on the routing (via clustering usually), mobility management and key management. However, in all the systems, the nodes need to find the heads actively. In another word, the head can take care of the nodes only after the nodes find the group heads. The nodes need to decide which group to join individually.

BRIEF SUMMARY OF EMBODIMENTS OF THE INVENTION

According to various embodiments of the invention systems and methods for group management in machine-to-machine networks are provided. Network nodes in a network group are divided into sub-groups and a group information register, which includes a listing of the nodes in the group, is divided into an equal number of partitions. The partitions are distributed to the sub-groups such that each node in a given sub-group receives the same partition. The partitions are accompanied by references to network nodes of other sub-groups (termed "anchor nodes") that have a copy of another partition of the group information register. When a new network head takes over the network group, it is able to use the available partitions to determine which partitions are missing and which nodes hold copies of the missing partitions. The group head can wake up the missing nodes and obtain the missing partition copies, thereby generating a complete copy of the group information register.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Figure 1:
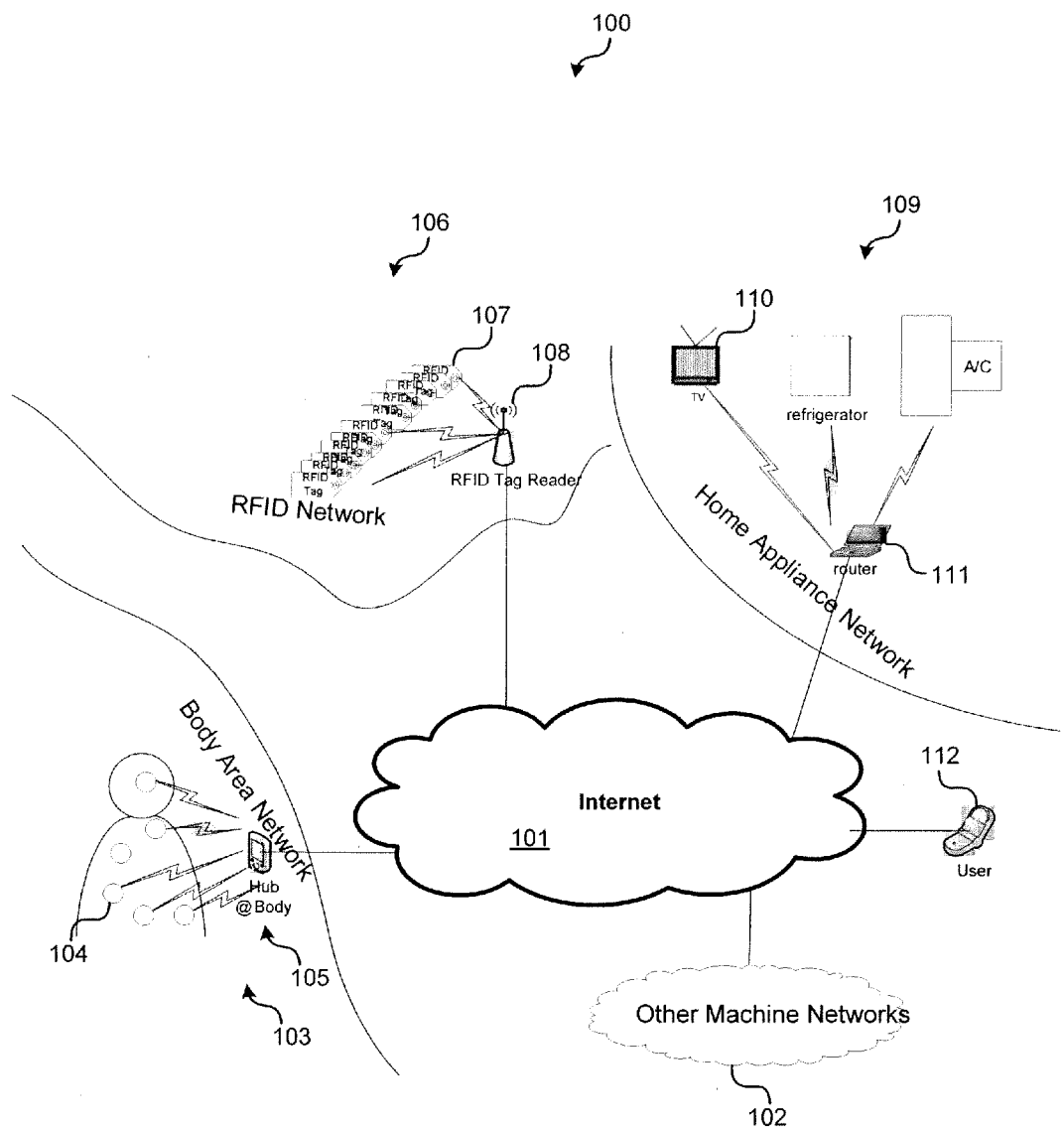
FIG. 1 illustrates an internet-of-things comprising a plurality of machine networks in communication with the Internet.

Before describing the invention in detail, it is useful to describe an example environment with which the invention can be implemented. One such example is that of an internet-of-things (IoT) or machine-to-machine (M2M) network. FIG. 1 illustrates an internet-of-things 100 comprising a plurality of machine networks 102, 103, 106, 109 in communication with the Internet 101. As an example, the IoT may include machine networks such as (a) RFID networks 106 comprising RFID Tag Readers 108 serving as group heads and RFID tags 107; (b) home appliance networks 109, which may include routers 111 or other computers serving as group head and various appliances 110 such as televisions, refrigerators, washing machines, lighting systems, and air conditioning units; and (c) body area networks (BANs) 105, which may comprise hub 105, such as a special purpose device, a PDA, or a smartphone serving as a group head, and a plurality of sensors or actuators 104 disposed at various locations in a patient's body. The hub 105 may serve various purposes, such as relaying between the network nodes 104 and external systems, collecting information from the nodes 104, and sending instructions to the nodes 104. Additionally, the IoT may include user devices 112, such as computers, or smartphones controlled by users to access the various machine networks.

Figure 2:
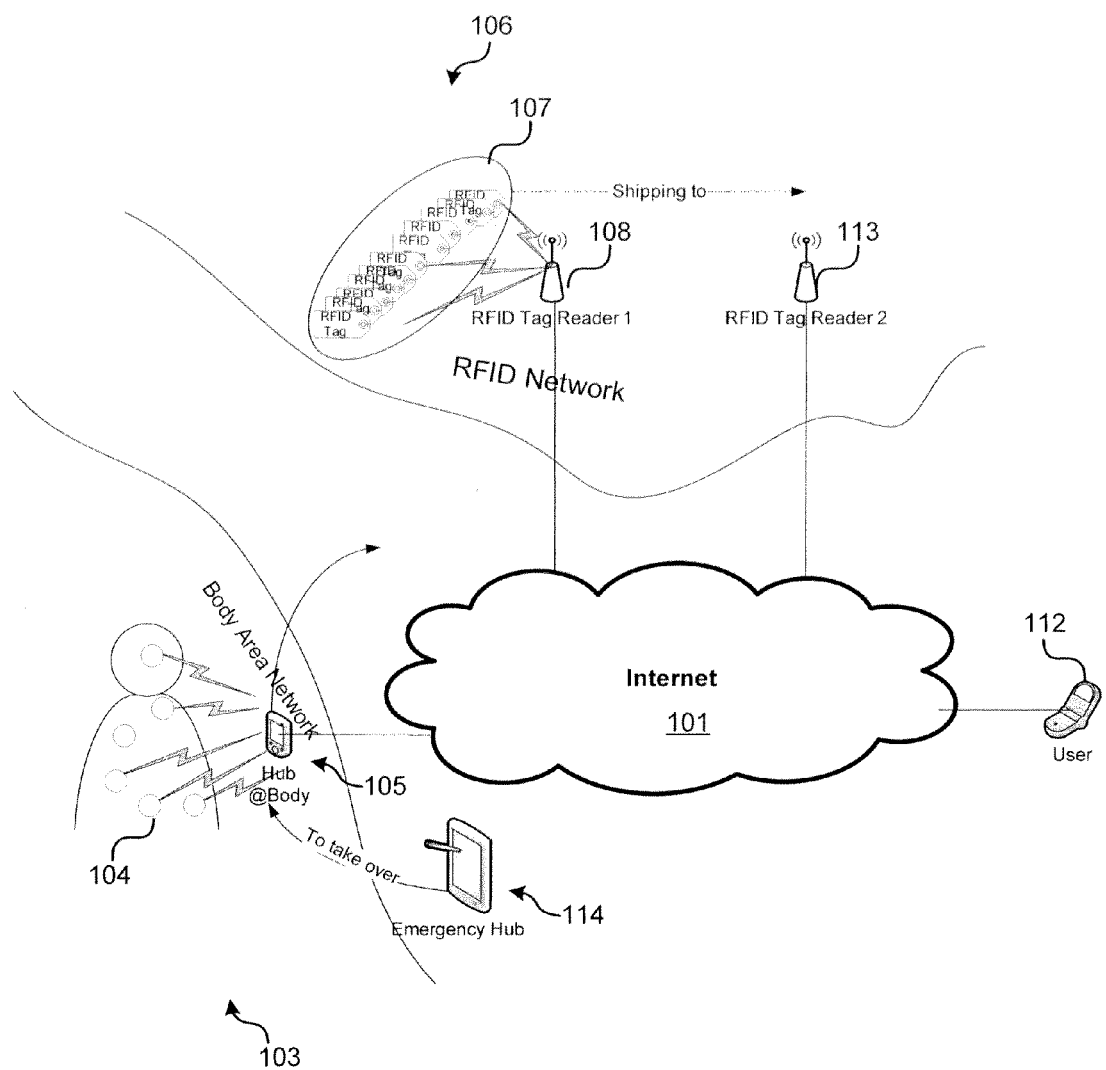
FIG. 2 illustrates two potential group handovers that may occur in the example environment of FIG. 1.

FIG. 2 illustrates two potential group handovers that may occur in the example environment of FIG. 1. In the RFID network 106, the packages associated with the RFID tags 107 may be shipped to a new location. At the new location, a second RFID Tag Reader 113 may take over as group leader, requiring a group handover. This group handover may occur outside the range of the first tag reader 108. In the BAN 103, a group handover may occur when the patient visits a hospital, or requires an emergency serves. For example, in an emergency situation, an emergency hub 114 may take over the group of nodes 104 from the pre-existing hub 105. This may allow emergency health professionals to quickly diagnose an emergency, and, in some cases, to administer emergency procedures. This group handover may occur with or without the original hub's 105 cooperation.

From time-to-time, the present invention is described herein in terms of these example environments. Description in terms of these environments is provided to allow the various features and embodiments of the invention to be portrayed in the context of an exemplary application. After reading this description, it will become apparent to one of ordinary skill in the art how the invention can be implemented in different and alternative environments. For example, although described in terms of one-hop networks with star topologies, the methods described herein may be extended to multi-hop networks.

The present invention is directed toward a system and method for group management in machine-to-machine networks. A typical network associated with embodiments of the invention comprises a network group head in communication with and directing a plurality of network nodes. The network nodes in the network group are divided into sub-groups. A group information register, which includes a listing of the nodes in the group, is divided into an equal number of partitions. The partitions are distributed to the sub-groups such that each node in a given sub-group receives the same partition. The partitions are accompanied by references to network nodes of other sub-groups (termed "anchor nodes") that have a copy of another partition of the group information register. When a new network head takes over the network group, it is able to use the available partitions to determine which partitions are missing and which nodes hold copies of the missing partitions. The group head can wake up the missing nodes and obtain the missing partition copies, thereby generating a complete copy of the group information register.

Embodiments of group management methods and systems implemented in accordance with the present invention may accomplish some or all of the following tasks: group creation, new node joining, old node dropping, group information updating, group head changing (handover), and group termination. In some embodiments, the group management methods and systems allow maintenance of group information to keep track of network members regardless of which group head is controlling the network or if the group head is about to change or has recently changed. In contrast to mobility management in cellular systems, mobility tracking is not a major objective of group management in these networks. Rather, a register is needed to store the group's information, such as group's member list (ID or address list), members' credentials (secret keys), and the connection information (session keys, temporary IDs, and so on). Anytime one new node joins in, an old node drops out, or one node changes its session key, the register is updated with the corresponding record. During handover, the group information register can provide the new group head with the necessary information and hence all members' connection/association with the new head can be built quickly.

For group handover in some networks, it is not feasible to let the new head request the group information from the old head because the old head might be offline, or reside in a different domain which is time consuming to reach. Accordingly, it is not feasible to let group heads transfer the group information between themselves. Furthermore, it is not suitable to suggest the individual nodes to rebuild the connection with the new head separately. First, due to the energy concerns, nodes may not always be online, which makes it difficult to request all the nodes to build the association with the new head as soon as it is in position. Second, without the transferred information from the old association, the new association process may be excessively time consuming. Third, simultaneous new association attempts can significantly lengthen the handover duration because of media access contention. Finally, possible multiple channel environments can deteriorate the handover situations.

Embodiments of the invention provide a group-information register that does not only reside in the group head so that the groups' information can be acquired during group handover when the head changes. In these embodiments, the group information register is distributed throughout the network. Consequently, the new head can know whether or not there is any member has been left out according to the group information stored in the register. If no member has been left out, the whole group is taken over, the connections rebuilt and the group information updated. If any node has been left out, additional methods of finding the missing nodes may be carried out.

Figure 3A:
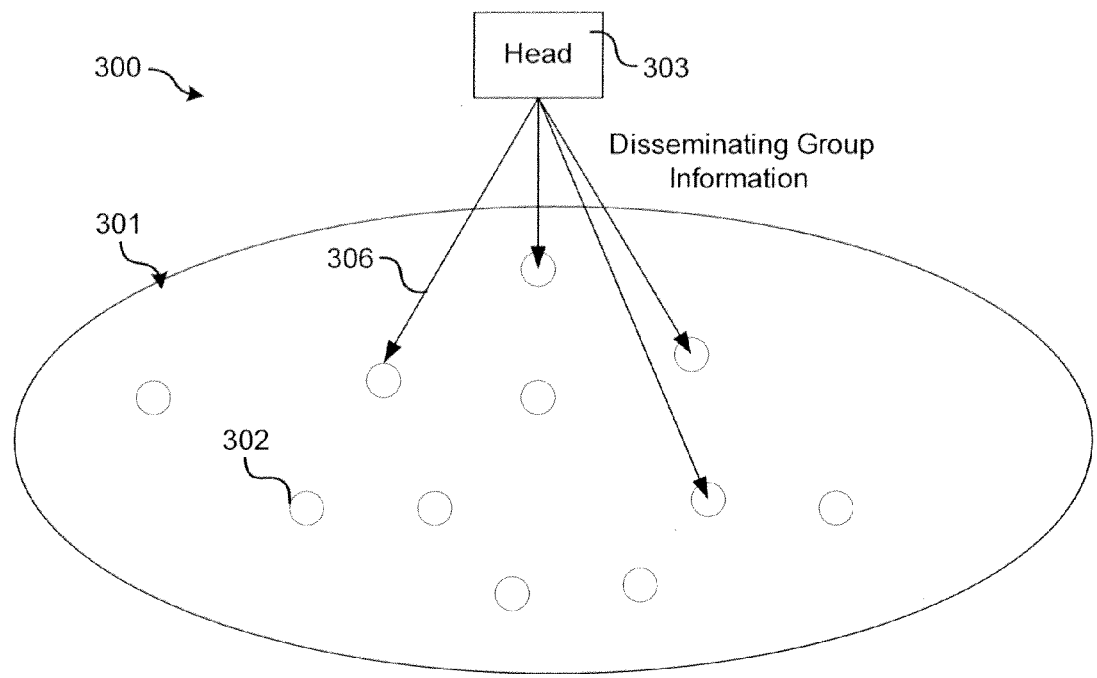
FIGS. 3A and 3B illustrate an overview of embodiments of the invention.
Figure 3B:
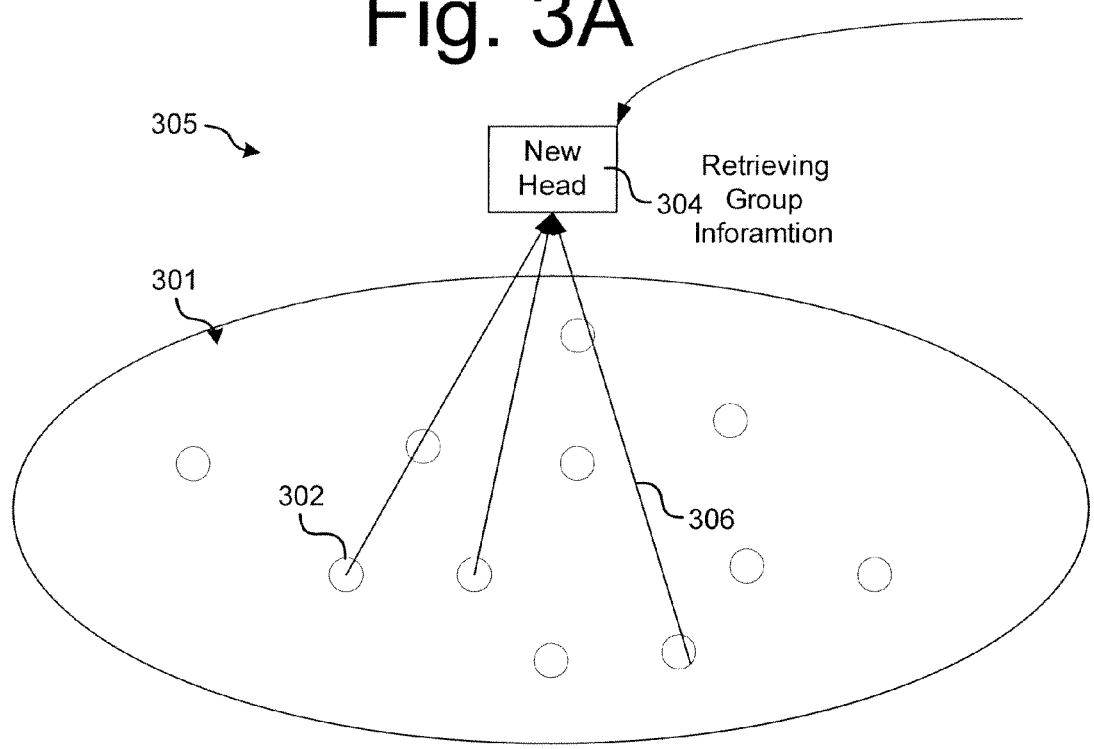

FIGS. 3A and 3B illustrate an overview of embodiments of the invention. A network 300 comprises a group 301 of application specific network nodes 302. The nodes 302 may comprise various devices, for example, BAN network elements such as sensors or actuators; or RFID tags. The network 200 also comprises a group head 303, for example a BAN hub or RFID tag reader. During normal network operation, the group head 303 distributes group information, such as a list of device IDs, session keys, last times of appearance, and device statuses, to the group 301. In some embodiments, this is accomplished by dividing the group information into a plurality of pieces 306. Different pieces 306 may be provided to different nodes 302.

FIG. 3B illustrates the network 305 after a handover to a new group head 304. After the handover, the new head 304 retrieves the pieces of the group information 306 from the nodes 302 of the group 301. The new head 304 is able to reconstruct the group information from the received pieces, thereby determining sufficient information to quickly rebuild associations with the nodes 302 of the group 301.

Some embodiments are designed for majority group handover. In a majority group handover, the majority of nodes 302 of group 301 remain after the handover. In the case where the majority of the nodes 302 leave the group 301 before or during the handover, the new head 304 is not taking over an existing group 301 and does not need to follow the group handover procedure.

Figure 4:
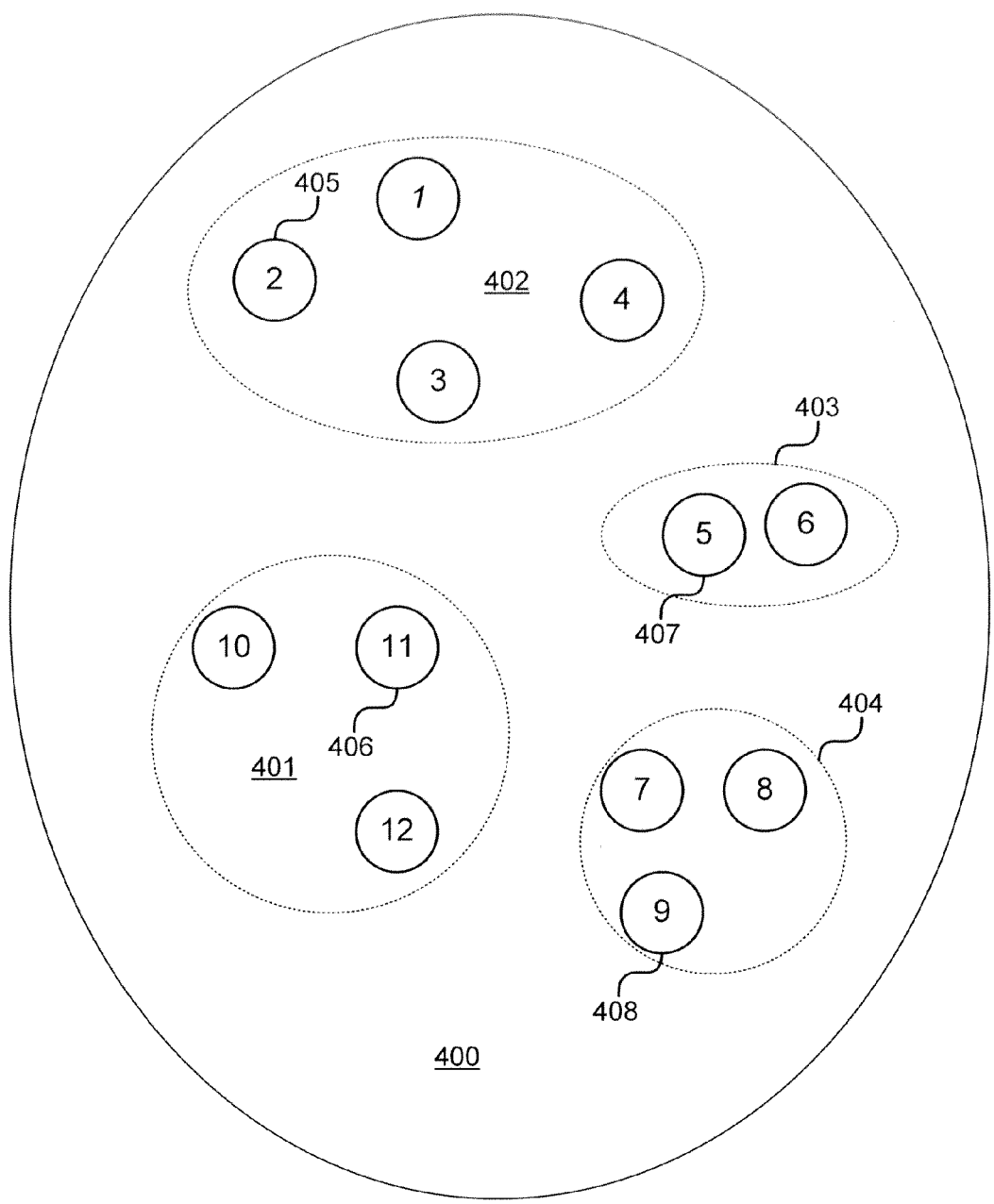
FIG. 4 illustrates an example of network sub-division for dissemination of group information.

FIG. 4 illustrates an example of network sub-division for dissemination of group information. The network 400 comprises a plurality of nodes 405, 406, 407, 408, indexed from 1 to N. In some embodiments, each node is provided a copy of the entire group information register—for example, if the group size N is small or the buffer size of each node is large enough. When each node is provided a copy of the entire group information register, a new group head can retrieve and rebuild the associations of the network 400 by receiving a copy of from any one of the nodes 405, 406, 407, or 408.

In some embodiments, the group 400 is divided into a plurality of M sub-groups 401, 402, 403, and 404. For example, this may occur when the group size N is large. In these cases, holding the whole group's 400 information for each node 405, 406, 407, 408 not only increases the signaling cost of group information register maintenance but also entails significant energy costs for typically power-limited nodes. Accordingly, in some embodiments, when the group size N exceeds a threshold, nodes 405, 406, 407, or 408 only hold a portion of the whole group information. In these embodiments, the group information register is divided into M pieces. However, at the other extreme, dividing the whole group information into too many pieces can make the group handover procedures intolerably long, diminishing the advantages of this dissemination approach. In some embodiments, the number of pieces M is determined algorithmically.

The network 400 is divided into a number of sub-groups 401, 402, 403, and 404 equal in number to the number M of pieces of the group information register. At least one member 405, 406, 407, 408 of each sub-group 401, 402, 403, 404 is provided a piece of the M pieces of the information register. In some embodiments, each member of each sub-group is provided a piece of the information register. Particularly, each member of the same sub-group shares the same piece of the information register.

In some embodiments, the nodes are distributed into sub-groups based on various node characteristics. For example, some nodes can have large power supplies while some have small-capacity batteries; some have ample memories while some have smaller memories; some nodes stay awake constantly while some may be frequently asleep. When a group head disseminates the group information to network 400, the same piece's dissemination may cause different impacts to different type of nodes 405, 406, 407, 408 in terms of communication cost and power cost. Additionally, some nodes 405, 406, 407, 408 may stay awake longer than other nodes 405, 406, 407, 408. Accordingly, in preferred embodiments, nodes that are awake more frequently are given larger pieces of the group information register. Accordingly, in some embodiments different types of nodes in the group 400 are given different weights/priorities in terms of holding group information pieces and group information piece sizes.

Figure 5A:
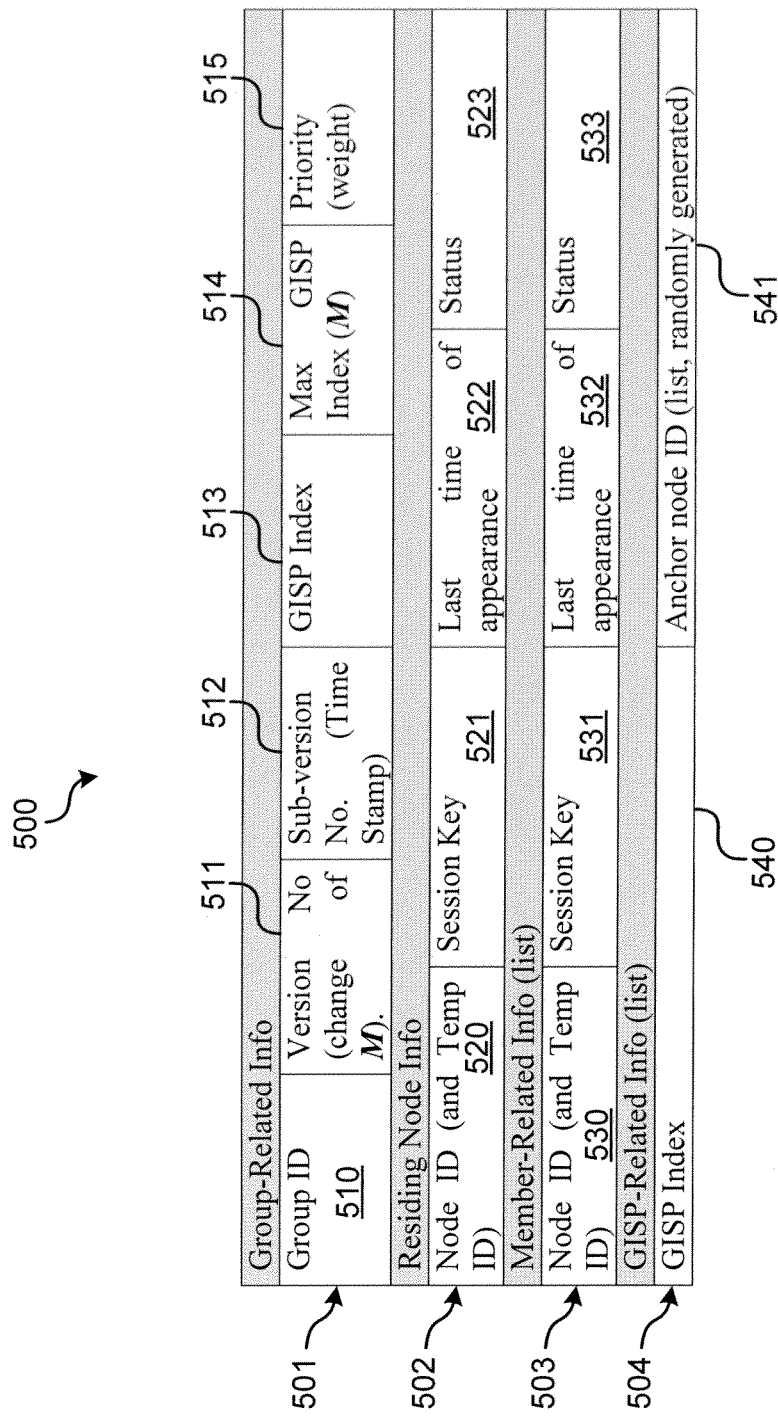
FIG. 5 illustrates a data structure that may be distributed to network nodes to disseminate pieces of a group information register.

FIG. 5A illustrates a data structure 500 (termed a "group information structure piece" or GISP) that may be distributed to network nodes to disseminate pieces of a group information register. In this embodiment, the GISPs 500 include various categories of information elements.

First, the GISP 500 includes a set of group related information 501. The group related information 501 includes a group ID information element 510. The group ID 510 is a unique ID number for the whole group. The information 501 further comprises a version number information element 511. The version number 511 for the GISPs 500 is updated when the number of subdivisions M changes. The sub version number 512, or timestamp, provides information regarding periodic group changes less disruptive than a change in M. The GISP index information element 513 provides indexing information about the subdivision of the group information register contained in the particular GISP 500. Accordingly, the GISP indexes 513 run from 1 to M. The maximum GISP index information element 514 indicates the total number of different group information register subdivisions M. In embodiments where the group information register is divided unequally, the GISP 500 also comprises a priority or weight information element 515 that details the proportion of the subdivision of the group information register provided in the GISP relative to the other GISPs. For example, in one embodiment, the length of list of member-related information 503, is determined by the priority/weight 515. In particular, sub-groups with GISPs that are assigned higher priority/weights 515 than other sub-groups' GISPs have proportionally longer member lists 503.

Next, the GISP 500 includes a set of information 502 related to the node that stores the GISP. After handover, the information 502 may assist the new group head in establishing a connection with the node after it reports the GISP 500. This information 502 includes a node ID 520 of the node storing the GISP 500. In further embodiments, a temporary ID may also be included. The information 502 further comprises a session key 521. The session key 521 may be used by the new group head in quickly re-establishing the session. The information 502 may also include a last time of appearance 522, indicating when the node was last awake and communicating with the network. The information 502 may also include status information 523 for the node storing the GISP 500.

The GISP 500 also includes the subdivision of the group information register 503. The subdivision 503 is a list of information related to other nodes in the network. In some embodiments, the list 503 lists node information for all nodes in the same sub-group as the node storing the GISP 500. In the illustrated embodiment, the list 503 includes a plurality of list items. Each list item includes a node ID 530 for another node in the network; and in particular embodiments, a node ID 530 for another node in the same sub-group. The list item further includes a session key 531 for communicating with the listed node 530, the last time of appearance for the node 532, and a status 533 of the node 530.

Finally, the GISP 500 includes at least one reference 504 to another GISP. The reference 504 includes a list of a GISP index 540 for the other GISP, and an ID 541 of another node in the network that stores the other GISP. In some embodiments, the GISP 500 contains a list of references to a GISP having every other index.

In some embodiments, different information elements in the GISP 500 are encrypted. In particular embodiments, each set 502, 503, and 504 of the GISP 500 is encrypted.

Figure 6:
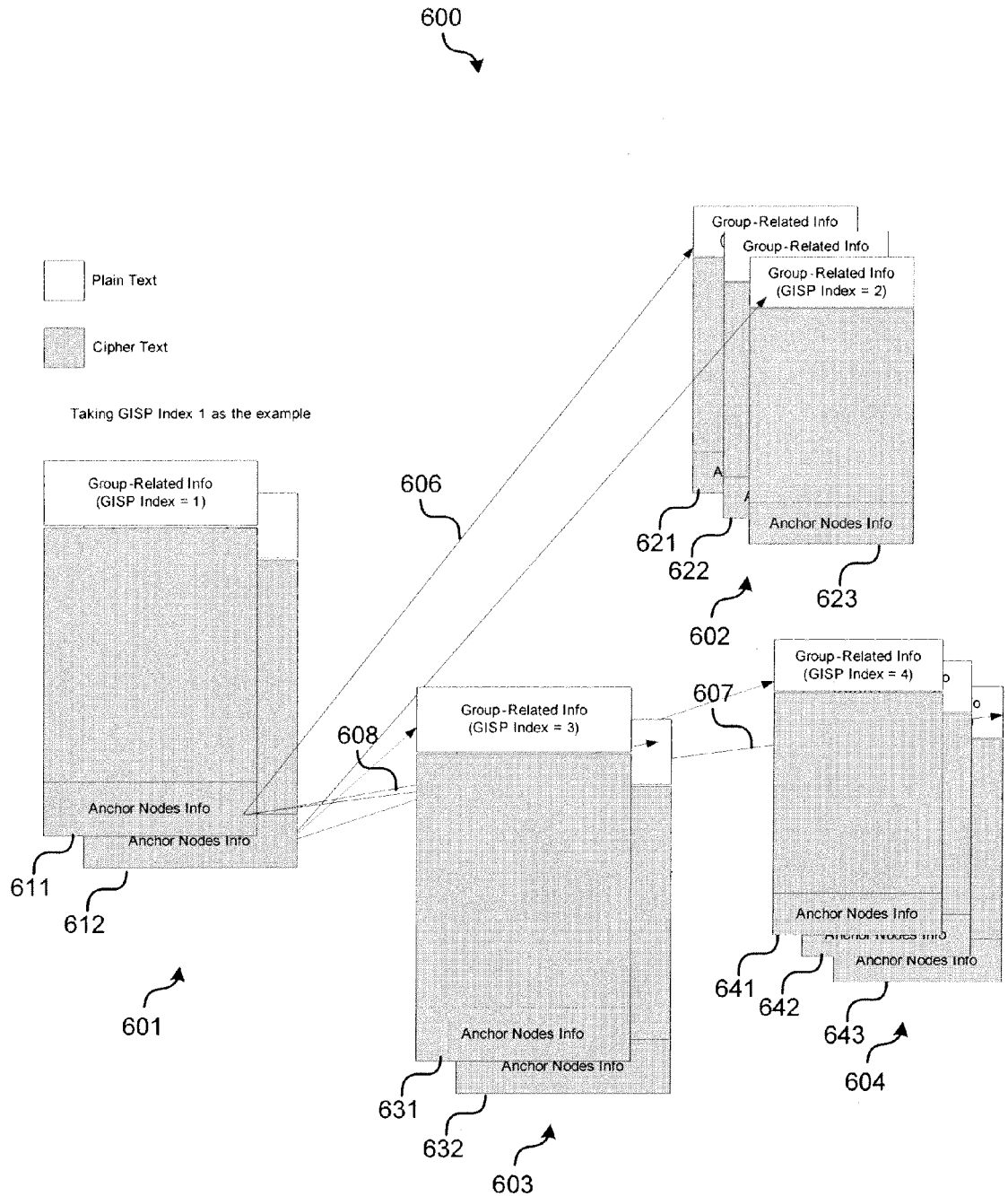
FIG. 6 illustrates the dissemination of subdivisions of a group information register throughout a network.

FIG. 6 illustrates the dissemination of GISPs throughout a network 600. As described above, the network 600 is divided into a plurality of sub-groups, 601, 602, 603, and 604. A group information register, detailing the nodes in the network, is divided into an equal number of pieces, M. In this embodiment, each member of each sub-group, i, is provided with a GISP having the same index i. For example, each node in the sub-group indexed 1 is provided a GISP 611 and 612 with index 1. As described above, each GISP 611 and 612 includes a listing of all other nodes in the sub-group 601. Additionally, each GISP 611 and 612 includes a plurality of links 607, 608 to GISPs stored by nodes of other sub-groups. Different GISPs 611, 612 in the same subgroup 601 include different residing node information 502 and also include different references from the other GISPs in the same subgroup 601. For example, GISP 611 may include: reference 606 to GISP 621, reference 607 to GISP 643, and reference 608 to GISP 632. GISP 612 may include references to GISP 623, 631, and 641. In some embodiments, a list of references contained in each GISP 611 may be randomly generated, so that different nodes holding the equally indexed GISPs can be reached by following the references of different nodes. In some embodiments, the random reference lists are generated such that each GISP in a subgroup is referenced by some GISP in each other sub-group. In other words, the reference lists from one sub-group may comprise a surjective mapping to the GISPs of the other sub-groups.

Returning to FIG. 3A, the group head 303 distributes the GISPs to the network 301 according to the group head's division of the network into different sub-groups. In some embodiments, to keep track of the dissemination 306, the group head 303 stores an index of disseminated group information structure pieces (GISPs) corresponding to each individual node as well as the previously disseminated version numbers. The group head 303 maintains the group information structure (GIS)—the entire collection network node information—and updates it periodically.

FIG. 5B illustrates types of information that are stored in the GIS in some embodiments of the invention. In some embodiments, the GIS may be stored in a table as illustrated, or may be stored in any other type of data structure. The GIS has two main parts, a set of group-related information 550 and a list of node related information 555.

The group related information 550 is similar to the group related information 501 in the GISPs 500. The group-related information 550 in the GIS includes group identification information 551, the latest version number 552, the latest sub-version number (e.g., a time stamp) 553, and the max GISP index 554 (e.g., the number of sub-groups.) However, the group-related information 550 in the GIS does not need to include priority or weight information.

The GIS further comprises a list 555 of node information of the nodes in the network. The node information 555 includes entries for each node in the network. The entries include the node ID (and temporary ID, if present) 556, the session key 557 for communicating with the node, the last time of appearance 558 of the node, other node status information 559, the GISP index 560 of the GISP stored by the node, the GISP status 561 of the GISP stored by the node, a GISP dissemination index information element 562, an indication 563 of the version and sub-version numbers of the last GISP disseminated to the node, and an information element 564, such as a flag, indicating whether the node is an anchor node. The GISP dissemination index 562 refers to the corresponding GISP disseminated or to be disseminated to the node. The last disseminated version number 563 informs the network head if the node has been provide the most recent GISP. Accordingly, the GIS contains all information necessary to operate as a network head for the plurality of network nodes. Upon taking over a network, the new network head recreates the GIS from the GISPs collected from the network nodes, and once recreated, maintains the GIS during network operation.

FIG. 5C illustrates further information that may be maintained by the group head. This information is a list 570 of all GISPs that have been disseminated to the network nodes. Each entry of the list 570 comprises a GISP index 571, a latest sub-version number 574 of the GISP (which will typically be the same as or smaller than the latest subversion 553 in the GIS), a dissemination status 572, an anchor node ID for the GISP having the index 571, and a priority/weight 573 for the GISP. In a particular embodiment, upon a certain sub-version number's 574 update, if one node's information has been changed in GIS, as indicated in GISP Status 561, the GISP version information table 570 is updated with the latest affected sub-version number information 574 (as the sub-version number 553) under the corresponding GISP index. The dissemination status 572 is also updated as "No". The update of this status will trigger the dissemination of this GISP. In some embodiments, an update timer may also be included, and the update of this status along with the update timer will trigger the dissemination of this GISP. The group head should then go through its GIS table and search all the node record with the same "Dissemination GISP Index" and start the dissemination to each of them one by one. The anchor node ID 575 is used for the generation of GISPs and will change after each successful dissemination.

Returning to FIG. 3, as nodes leave and join the network, and other network changes occur, the GIS will periodically change. When the GIS changes, the group head 303 disseminates and updates the corresponding GISPs to each individual node 302. Each node 302 updates either part of or the whole GISPs stored locally according to the instructions from the head 303. When the new head 304 is in position, it requests to retrieve the GISPs 306 from available nodes 302. In some embodiments, the new head 304 may wake up certain sleeping nodes in order to retrieve the uncollected GISPs according to the decrypted information from the received GISPs 306. When all the GISPs have been retrieved and GIS has been recovered, the whole group can be successfully taken over. In some embodiments, the individual association rebuilding processes can be carried out in parallel with the retrieval process as well as the new dissemination process. In some embodiments, each individual node's record in the GIS maintained by the head 303 includes the GISP index and the version number which was previously distributed.

In some embodiments, at least one node of each sub-group maintains encrypted GISP information encrypted such that it can be decrypted with a predetermined network authority. For example, this may occur where the group may be taken over by an authority or emergency rescue—for example, if the network is a BAN. In some cases, a single node from each group, such as node 612, 632, 642, and 622 are selected from each sub-group. In this case, the nodes storing the GIS sub-divisions encrypted for the network authority also store references to the other nodes in the other sub-groups that also store the specially encrypted information. In other embodiment, each GISP includes a copy of the GIS information that is encrypted using a private encryption key and a copy of the GIS information that is encrypted using the encryption method for network authority takeover.

The number of sets of GISPs (i.e. the maximum GISP index, M), may depend on several factors. For example, M may be determined based on handover latency requirements. If handover requires faster handover, the whole GIS is divided into fewer pieces. Another factor is the number of waking nodes and probability density function (PDF) for woken nodes. If there are only a few nodes awake at the same time in the group, the number of GISPs should be smaller because, otherwise, the new head cannot retrieve enough GISPs in sufficient time. A third factor is buffer and battery limitations. If some nodes have limited memories and power limitations, the nodes cannot support large GISP sizes or frequent GISP updates. Another factor is security requirements. Dividing the GIS into fewer pieces can expedite the take over process but dividing the GIS into more pieces can lower the risk of large portions of the GIS being leaked. Other factors include the time and energy cost of the wake-up mechanisms used by the network nodes. Accordingly, the specific choice of M may vary in different applications according to these or other factors.

Figure 7:
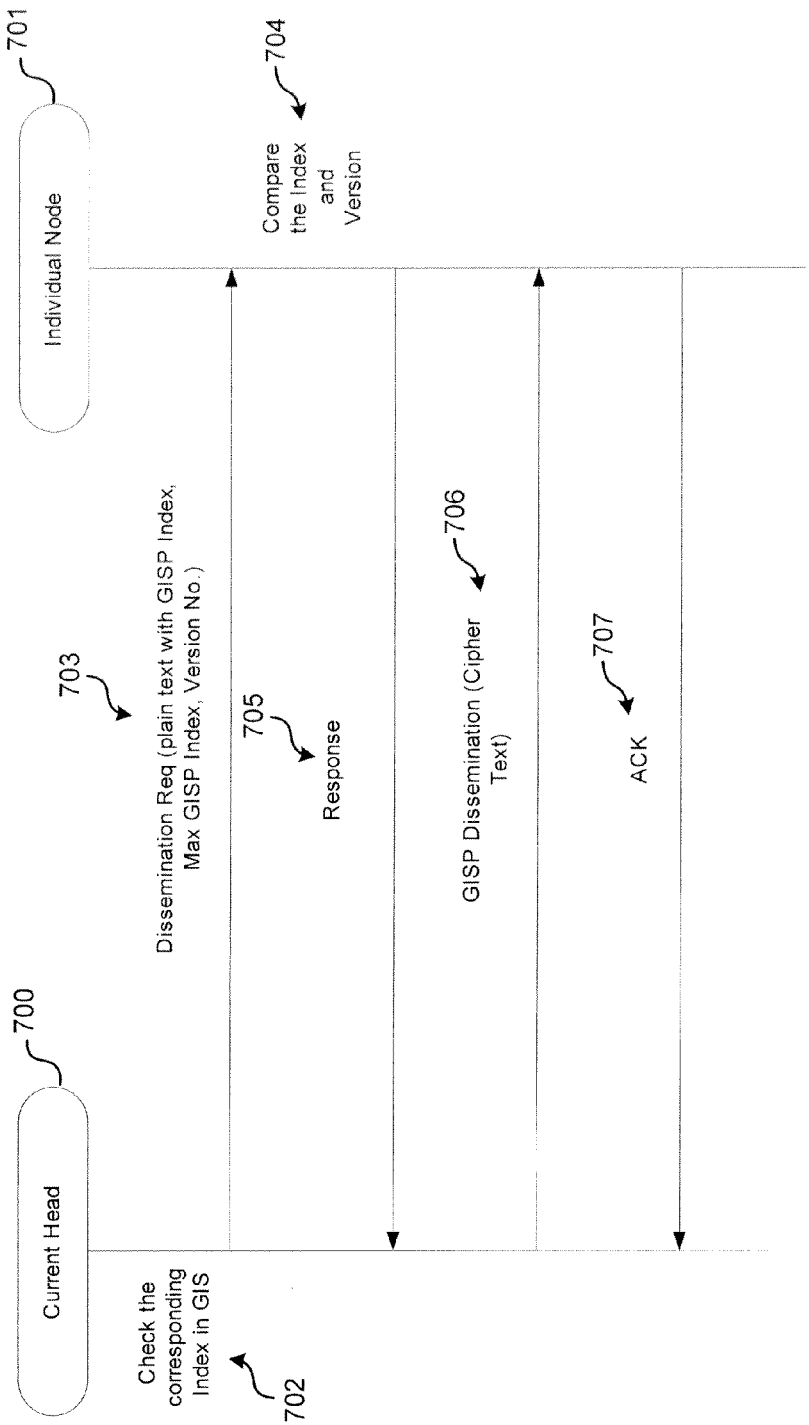
FIG. 7 illustrates a process of group information dissemination implemented in accordance with an embodiment of the invention.

FIG. 7 illustrates a process of group information dissemination implemented in accordance with an embodiment of the invention. As described above, the current group head 700 maintains a group information register (GIS) and sub-divides the GIS to create a plurality of GISPs. In the illustrated embodiment, the head 700 periodically performs a GISP dissemination procedure. For example, the group head 700 may perform an update any time a node joins or leaves the group, a session key changes, or another piece of information contained in the GISPs changes. In a first step of the process, the head 700 selects a node 701 from the network group. Using the stored copy of the GIS, the head 700 determines 702 the index for the selected node 701. After determining which GISP the node 701 is maintaining, the group head 700 transmits 703 a dissemination request. In the illustrated embodiment, the transmission 703 comprises a copy of the unencrypted part of the updated GISP. For example, the dissemination request 703 may include plain text information elements with the GISP index, the maximum GISP index, the version and subversion number, the GISP priority, and the latest affected version number. In some embodiments, information not necessary for dissemination of the update, such as the GISP priority, may be omitted from the dissemination request 703.

Upon receiving the dissemination request 703, the node 701 determines 704 if the member related information 503 of its GISP needs to be updated. For example, in some embodiments, the version number and the latest affected sub-version number are used to indicate the nodes listed in the member related information 503 have changed. In particular, when a node receives a dissemination request, it will compare the latest affected sub-version number with its version number. If the received one is bigger, it will update the encrypted part of the GISP by the following procedure. If the received one is smaller, which means the stored GISP in the node is not out-of-date/affected, the node only updates its version number to the received version number, including the sub-version number, and indicates the procedure ends via the response 705 to the group head. As another example, if the max GISP index 514 changes, this can indicate that the reference information 504 needs updating. As a further example, if the GISP index 513 has changed, then the entire GISP may require an update. As part of the determination step 704, the node 701 compares the information in the dissemination request 703 to the corresponding information stored in the node's 701 GISP.

In step 705, the node 701 transmits a response 705 to the group head. If the node 701 determines that the encrypted GISP information, such as the member list reference information, or the entire GISP needs to be updated, then the node 701 requests a GISP dissemination from the head 700. If the node 701 determines that its encrypted information does not need updating, the node 701 can update the sub-version or timestamp of its GISP, and transmit a response 705 that indicates no GISP dissemination is needed. For example, a node in another sub-group may have had its status updated to dropped, or purged from the GIS without changing information in the node's 701 GISP. This change would result in a sub-version or timestamp change, but the information contained in the transmission 703 would indicate that the node 701 would not need to change its GISP.

If the node 701 requests a GISP dissemination, then the head 700 transmits the requested GISP information 706. The node 701 then updates its GISP, including version, and sub-version information, and transmits an acknowledgement (ACK) packet 707 to the head 700.

In some embodiments, the head 700 maintains records of the disseminations to the nodes 701. The head 700 further determines a proper distribution of GISPs. For example, the head 700 may determine the priorities given to the network nodes and determine which sub-groups the nodes are placed in. In a particular embodiment, all nodes having the same priority are placed in the same sub-group. For example, all nodes that have lower power limitations are placed in the largest sub-group, because such nodes are able to store longer GIS subdivisions. The nodes that have higher power limitations may be distributed into smaller sub-groups, to efficiently distribute the GIS among the network nodes.

In some embodiments, the head's 700 GISP update can be performed periodically. In one embodiment, the update period is determined by the arrival rate and departure rate of group members. In another embodiment, for example if the arrival and departure of group members have no predictable distribution pattern, some practical value for the update frequency may be chosen. Additionally, in some embodiments, the group management system does not need to have a constantly accurate list of network members because if some group information change has not been updated and disseminated to individual nodes before a new head takes place, failures will not occur because the group management may be performed in parallel with individual access procedures.

Figure 8:
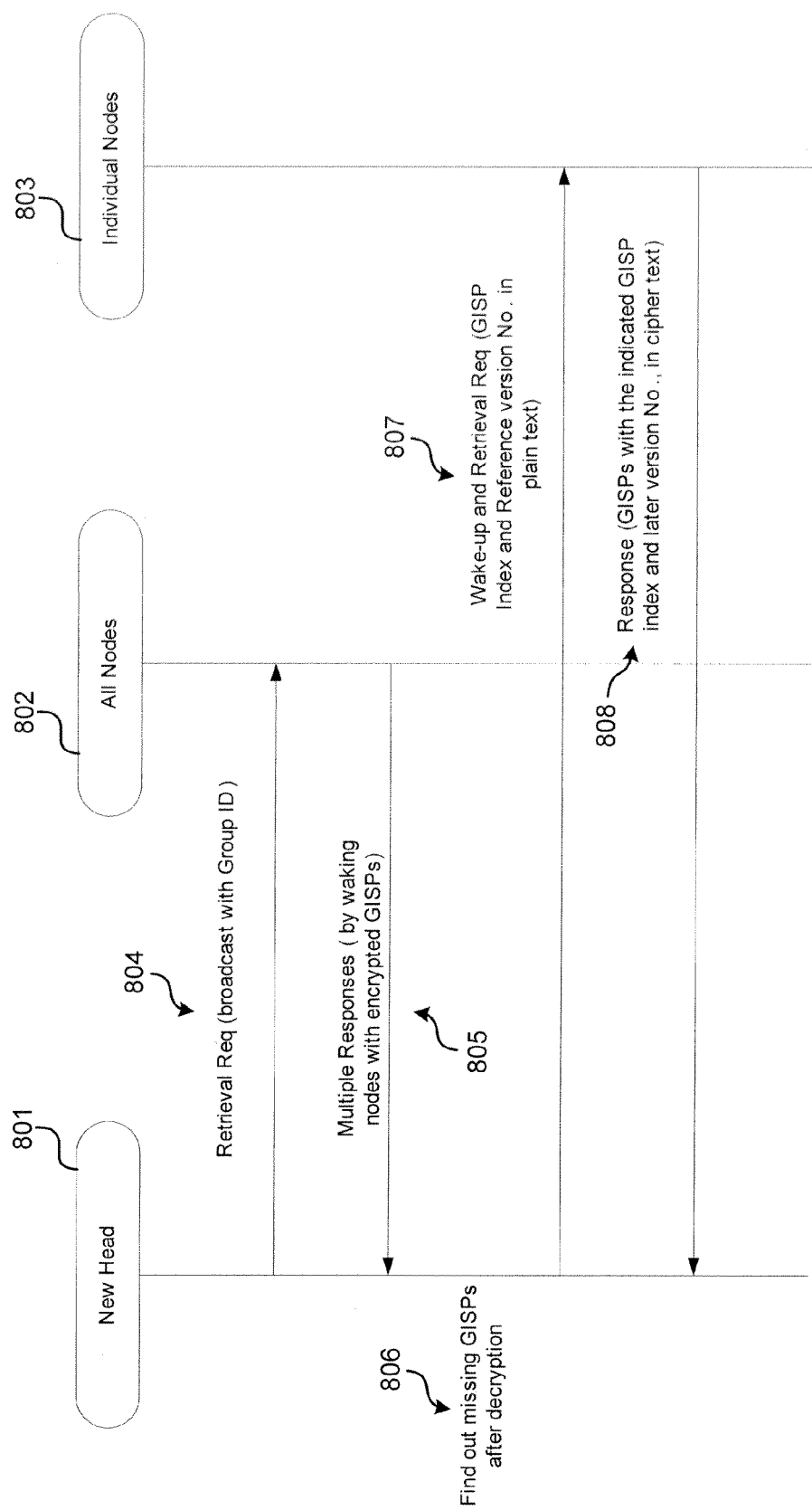
FIG. 8 illustrates a method of group handover implemented in accordance with an embodiment of the invention.

FIG. 8 illustrates a method of group handover implemented in accordance with an embodiment of the invention. Group handover occurs when a new group head 801 connects with the group of network nodes. In the illustrated embodiment, the new group head 801 performs standard authentication procedures, and retrieves the encryption key for the encrypted GISPs stored by the group nodes. In other embodiments, the head 801 may be a network authority, such as an emergency rescue or hospital authority, and may use a predetermined authority key for the connection, as described above. The new head 801 then initiates the handover by broadcasting a retrieval request 804 to the group 802. In some embodiments, multiple network groups may be in range of the group head 801. The retrieval request 804 may include the Group ID 510 so that network nodes within range of the new head 801 can determine if they should respond to the request 804.

Awake nodes 802 within the group receive the retrieval request 804. These nodes 802 then respond to the retrieval request by transmitting their GISPs 805. The new head 801 then decrypts the received GISPs. Due to the versioning information, max GISP index, and GISP indexing, the new head 801 can determine if any GISPs are missing from the responses 805. For example, the new head 801 can determine the latest version for the GISPs from the maximum version listed in the responses 805. The head 801 determines the max GISP index from GISPs having the last version. The head 801 then determines which indexed GISPs with the correct version it received.

After determining if any GISPs are missing, the head 801 can use the reference information contained in the current GISPs to determine the identity of nodes storing the missing GISPs. The head 801 then transmits a wake up message and retrieval request 807 to individual nodes 803 having the missing information. In some embodiments, the retrieval request 807 can include information similar to that of the dissemination request 703. In other embodiments, the retrieval request 807 includes the requested GISP index and version number for the GISP stored by the node 803. After waking up and receiving the response, the node 803 transmits the requested GISP 808 to the head 801.

After the head 801 retrieves all the latest GISPs, the head 801 can recover the GIS from the assembled GISP pieces. As indicated, this may occur after the responses 805 from the broadcast request 804, if sufficient GISPs were returned by the nodes 802. Otherwise, this may occur after the specific responses 808 from the retrieval requests 807 transmitted to the specific nodes 803. After the head 801 assembles the GIS, the head may begin rebuilding the connections or association with the group members listed in the GIS.

In some cases, the head 801 may be unable to retrieve all of the latest GISPs. In some embodiments, the head 801 reassembles as much as the GIS as it can using the latest GISPs. In other embodiments, the head 801 reassembles the GIS using the latest versioned GISPs and fills in the missing information with earlier-versioned GISPs. Although the earlier versions may have out of date information, they may still indicate some of the nodes that would otherwise be missing from the GIS. In both types of embodiments, corrections to the GIS may then be implemented using standard association procedures. In the extreme case, where the head 801 is unable to retrieve the group information within a certain period, it will start the connection with each individual node one by one.

During the handover procedure illustrated in FIG. 8, the new head 801 can also perform standard connection processes with the identified nodes. For example, after identifying missing GISPs in step 806, the new head 801 can build connections or associations with the nodes listed in the returned GISPs while it recovers the missing GISPs from nodes 803. Additionally, if network changes occur during the group handover procedure, such as some nodes dropping and some nodes joining, these individual procedures can be carried out simultaneously without affecting the dissemination/retrieval procedures.

As described above, in some embodiments, the previous head of the network group distributes the GISPs in a manner that facilitates retrieval of the GIS by the new head 801. For example, the previous head gives longer GISPs to devices having less power limitations or larger memory buffers. These devices will often remain awake during the handover. Accordingly, they will be part of the set of awake nodes 802. The new head 801 will therefore retrieve longer GISPs during the initial broadcast request, and will only miss shorter GISPs.

Additionally, in some embodiments, a group head, such as group head 801 or 700 may broadcast a group termination message to the network. Upon receiving the group termination message, the nodes clears its GISP.

In some embodiments, the method illustrated in FIG. 8 is used any time a group head begins operation. In other cases, when the head only has a uniform secret key and ID of this group (usually an IP address), such as when a test device 801 is taking over a new BAN or a new tag reader is reading RFID tags in range, it can broadcast its existing status and wait for the members to join in. In this case, the head 801 is assumed to have the physical links with its members who have not been associated with another head yet. It is also assumed that in this case after sensing the existence of the head, the members will attempt to build associations with the head until succeeding or being rejected. When a group is created, the group ID will be sent to each member 803.

Figure 9:
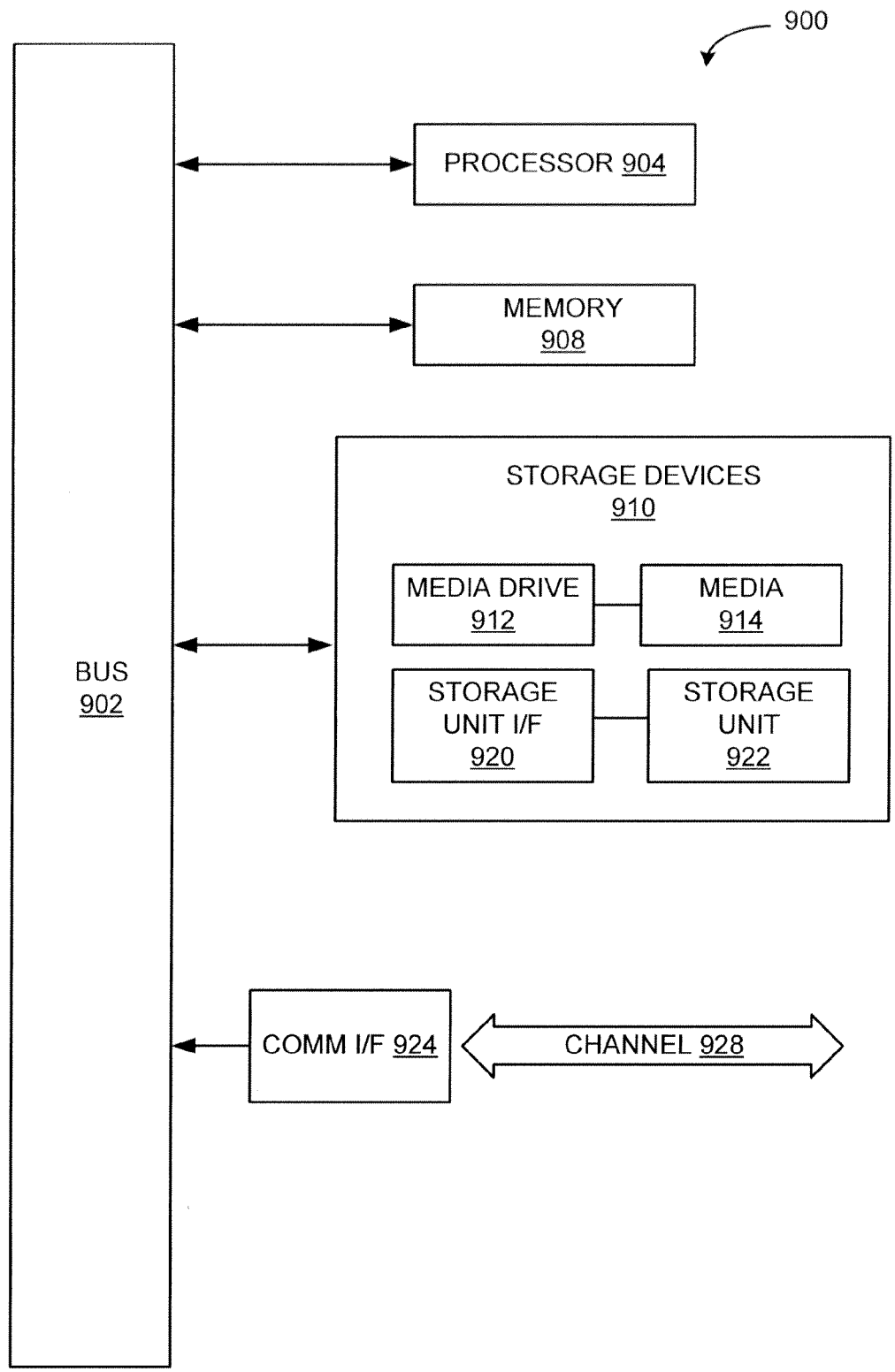
FIG. 9 illustrates an example computing module that may be used in implementing various features of embodiments of the invention.

The process of new members' joining-in is usually in parallel with the process of group creation or group handover. The first possible case is that when the head receives a command from the operator about a new member, it will initiate the connection and association procedure. The second possible case is more common. In a wireless network, when the new member detects the existence of current IoT, it will initiate the connection and association proactively. After being associated with the head, the new member acquires the group ID and the new member's information has been added into the group information register. After joining in the group, the node starts to accept the GISP dissemination and the corresponding GISP update of the group As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 9. Various embodiments are described in terms of this example-computing module 900. After reading this description, it will become apparent to a person skilled in the relevant art how to implement the invention using other computing modules or architectures.

Referring now to FIG. 9, computing module 900 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 900 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 900 might include, for example, one or more processors, controllers, control modules, or other processing devices, such as a processor 904. Processor 904 might be implemented using a general-purpose or special-purpose processing engine such as, for example, a microprocessor, controller, or other control logic. In the illustrated example, processor 904 is connected to a bus 902, although any communication medium can be used to facilitate interaction with other components of computing module 900 or to communicate externally.

Computing module 900 might also include one or more memory modules, simply referred to herein as main memory 908. For example, preferably random access memory (RAM) or other dynamic memory, might be used for storing information and instructions to be executed by processor 904. Main memory 908 might also be used for storing temporary variables or other intermediate information during execution of instructions to be executed by processor 904. Computing module 900 might likewise include a read only memory ("ROM") or other static storage device coupled to bus 902 for storing static information and instructions for processor 904.

The computing module 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a floppy disk drive, a magnetic tape drive, an optical disk drive, a CD or DVD drive (R or RW), or other removable or fixed media drive might be provided. Accordingly, storage media 914 might include, for example, a hard disk, a floppy disk, magnetic tape, cartridge, optical disk, a CD or DVD, or other fixed or removable medium that is read by, written to or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing module 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory module) and memory slot, a PCMCIA slot and card, and other fixed or removable storage units 922 and interfaces 920 that allow software and data to be transferred from the storage unit 922 to computing module 900.

Computing module 900 might also include a communications interface 924. Communications interface 924 might be used to allow software and data to be transferred between computing module 900 and external devices. Examples of communications interface 924 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 924 might typically be carried on signals, which can be electronic, electromagnetic (which includes optical) or other signals capable of being exchanged by a given communications interface 924. These signals might be provided to communications interface 924 via a channel 928. This channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 908, storage unit 9 20, media 914, and channel 928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 900 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for group management of a plurality of network devices, the plurality of network devices forming a network, comprising:
    dividing a group information register into a plurality of subdivisions, wherein the group information register includes a listing of the plurality of network devices;
    distributing a copy of the first subdivision of the group information register to a first network device in a first sub-group of the network;
    distributing a copy of the second subdivision of the group information register to a second network device in a second sub-group of the network; and
    distributing, to the first network device in the first sub-group, a reference to the copy of the second subdivision of the group information register,
    wherein the group information register does not only reside in a group head of the plurality of network devices such that information of the plurality of network devices can be acquired during group handover when the group head changes.

2. The method of group management of claim 1, further comprising:
    distributing a plurality of copies of the first subdivision of the group information register to a plurality of network devices in the first sub-group of the network; and
    distributing a plurality of copies the second subdivision of the group information register to a plurality of network devices in the second sub-group of the network; and
    distributing a plurality of references to copies of the second subdivision of the group information register to the plurality of network devices in the first sub-group of the network;

wherein the plurality of references to the second subdivision surjectively map the plurality of copies of the first subdivisions to the plurality of copies of the second subdivision.

3. The method of claim 1, wherein a copy of the plurality of the copies of the first subdivision and a copy of the plurality of the copies of the second subdivisions are encrypted such that they can be decrypted with a key available to an external network authority.

4. The method of claim 1, wherein the plurality of subdivisions is indexed and the network is divided into an indexed plurality of sub-groups equal in number to the plurality of subdivisions; and further comprising:
for each indexed subdivision of the plurality of subdivisions of the group information register, distributing a copy of the indexed subdivision to a network device from a sub-group having the same index as the indexed subdivision; and
for each of the sub-groups, distributing to the network device receiving the copy of the indexed subdivision, references to copies of every other indexed subdivision of the group information register.

5. The method of claim 4, further comprising distributing to each network device of each indexed subgroup, a copy of the correspondingly indexed subdivision of the group information register.

6. A method for group management of a plurality of network devices, the plurality of network devices forming a network, comprising:
dividing a group information register into a plurality of subdivisions, wherein the group information register includes a listing of the plurality of network devices;
distributing a copy of the first subdivision of the group information register to a first network device in a first sub-group of the network;
distributing a copy of the second subdivision of the group information register to a second network device in a second sub-group of the network;
distributing, to the first network device in the first sub-group, a reference to the copy of the second subdivision of the group information register,
wherein the plurality of subdivisions is indexed and the network is divided into an indexed plurality of sub-groups equal in number to the plurality of subdivisions, and further comprising:
for each indexed subdivision of the plurality of subdivisions of the group information register, distributing a copy of the indexed subdivision to a network device from a sub-group having the same index as the indexed subdivision;
for each of the sub-groups, distributing to the network device receiving the copy of the indexed subdivision, references to copies of every other indexed subdivision of the group information register;
distributing to each network device of each indexed subgroup, a copy of the correspondingly indexed subdivision of the group information register; and
distributing to each network device of each indexed subgroup, references to copies of every other subdivision of the group information register.

7. The method of claim 6, wherein the references provided to different network devices in each indexed subgroup reference different copies of every other subdivision of the group information register.

8. The method of claim 4, wherein the number of subdivisions is determined based on at least one of: a handover latency requirement; a number of awake nodes of the network at a time; a probability density function for a number of awake nodes at a time; an average buffer size of the network devices; a buffer size limitation of the network devices; battery limitations of the network devices; energy or time costs of waking up; and security requirements for the network.

9. A method for group management of a plurality of network devices, the plurality of network devices forming a network, comprising:
dividing a group information register into a plurality of subdivisions, wherein the group information register includes a listing of the plurality of network devices;
distributing a copy of the first subdivision of the group information register to a first network device in a first sub-group of the network;
distributing a copy of the second subdivision of the group information register to a second network device in a second sub-group of the network;
distributing, to the first network device in the first sub-group, a reference to the copy of the second subdivision of the group information register,
wherein the plurality of subdivisions is indexed and the network is divided into an indexed plurality of sub-groups equal in number to the plurality of subdivisions, and further comprising:
for each indexed subdivision of the plurality of subdivisions of the group information register, distributing a copy of the indexed subdivision to a network device from a sub-group having the same index as the indexed subdivision;
for each of the sub-groups, distributing to the network device receiving the copy of the indexed subdivision, references to copies of every other indexed subdivision of the group information register;
after modifying the number of subdivisions in the plurality of subdivisions and the number of sup-groups in the network:
for each given subdivision of the plurality of subdivisions of the group information register, re-distributing an updated copy of the given subdivision to the network device from the sub-group having the same index as the given subdivision or distributing an updated copy of the given subdivision to a new network device from the sub-group having the same index as the given subdivision; and
for each of the sub-groups, distributing to the network device receiving the copy of the given subdivision, references to updated copies every other indexed subdivision of the group information register.

10. The method of claim 9, further comprising updating a version number of the subdivisions in the plurality of subdivisions.

11. The method of claim 1, wherein the group information register comprises a listing of device IDs of the plurality of network devices.

12. The method of claim 11, wherein the group information register further comprises status information, session keys, and last times of appearance for the plurality of network devices.

13. The method of claim 11, wherein each copy of each subdivision of the group information register is contained in a data structure, each data structure further comprising:
an ID of the network device storing the data structure;
an ID for the network; and
a version number for the data structure.

14. The method of claim 13, wherein each data structure further comprises a reference to a copy of another subdivision of the group information register.

15. The method of claim 14, wherein each data structure further comprises references to a copy of each other subdivision of the group information register.

16. The method of claim 15, wherein the data structures containing copies of the same subdivision contain references to different copies of each other subdivision of the group information register.

17. A network device operable as a group head for a plurality of network devices, the plurality of network devices forming a network, comprising:
- a radio module;
- a controller configured to cause the group head to perform the steps of:
- dividing a group information register into a plurality of subdivisions, wherein the group information register includes a listing of the plurality of network devices;
- distributing a copy of the first subdivision of the group information register to a first network device in a first sub-group of the network;
- distributing a copy of the second subdivision of the group information register to a second network device in a second sub-group of the network; and
- distributing, to the first network device in the first sub-group, a reference to the copy of the second subdivision of the group information register,
- wherein the group information register does not only reside in the group head such that information of the plurality of network devices can be acquired during group handover when the group head changes.

* * * * *